Patented Mar. 11, 1952

2,588,826

UNITED STATES PATENT OFFICE 2,588,826

PROCESS FOR THE MANUFACTURE OF IMPROVED DRYING OILS BY THE CONDENSATION OF UNSATURATED MINERAL OIL POLYMERS WITH ALDEHYDES

Robert C. Goodwin, Lubbock, Tex., assignor to Phillips Petroleum Company, a corporation of Delaware No Drawing. Application September 27, 1945, Serial No. 618,991

7 Claims. (Cl. 260—606)

This invention relates to a method for producing an improved drying oil. More particularly, it relates to a method for producing an improved drying oil from hydrocarbon polymers of mineral origin and to drying oils resulting from such a method.

Mineral drying oils are obtained through the polymerization of highly unsaturated lighter hydrocarbons of mineral origin such as are found in unrefined gasoline produced by vapor, liquid, or mixed phase hydrocarbon cracking processes, either thermal or catalytic.

Vapor phase cracking processes are distinguished from liquid phase processes in that the former operate at relatively higher temperatures and relatively lower pressure than do the latter. The gasoline and gases produced by vapor phase cracking are generally much higher in unsaturates (particularly of the more reactive types) than are the gasolines and gases produced by liquid phase cracking.

In order to remove these highly unsaturated bodies, as well as color bodies, from cracked gasoline, such gasoline is treated with a polymerizing agent, such as fuller's earth or sulphuric acid, or simply by the application of heat and pressure in the presence or absence of a contact material. For example, in one such polymerizing process operating at present, the unrefined cracked gasoline (which has been separated from heavier constituents by fractionation) is passed in liquid or vapor phase through a tower packed with fuller's earth or similar earthy polymerizing material. Here polymerization of the more active ingredients of the cracked material takes place, such polymers (along with some of the heavier ends of the gasoline) then being drained off in liquid form from the earthy polymerizing material. These polymers when brought, say, to a viscosity at 100° F. of 175 (Saybolt Universal) by removal of lighter materials through distillation, show pronounced drying qualities equal to and, in many instances, superior to vegetable drying oils.

It has been found that when highly unsaturated mineral hydrocarbons such as are found in unrefined vapor or mixed phase cracked gasoline are brought into contact, preferably in vapor phase, with active contact masses such as fuller's earth, active clay, silica gel and the like, the most active hydrocarbons are polymerized to heavy mineral hydrocarbons possessing marked drying properties, that is, compounds capable of removing oxygen from the air and thereby rapidly forming solid, dry films whose solubility in petroleum solvents decreases as the oxidation increases.

The materials whose use is contemplated in the present invention are polymers formed by the moderate action of active contact masses or dilute sulfuric acid on unrefined gasoline, produced by vapor, liquid, or mixed phase cracking, such polymerization with contact masses occurring in the liquid or vapor phase, or with dilute sulfuric acid in the liquid phase. Such a reaction may be carried on at temperatures ranging from 150° F. to 650° F. for contact masses, and from ordinary temperatures to 200° F. for dilute sulfuric acid. It will in general be found that an increase in reaction time or in reaction temperature or acid concentration will decrease the iodine number and increase the drying time of a material such as described above. As one specific example of the process of deriving polymers to be used in the present process, naphtha is polyformed with propane at a temperature of about 1050° F. and pressure of about 1500 pounds per square inch in a mixed phase operation. The product is then fractionated to separate heavier ends, the remaining gasoline vapors then being brought without further refining steps into contact with an active contact mass such as fuller's earth or other active clay at temperatures of 150° to 650° F. to cause polymerization of the most unsaturated portions of the gasoline. In this polymerizing step the reaction time and temperature are regulated as indicated above to produce polymers of the desired characteristics. The polymers may then be separated from the gasoline by condensation or fractionation and are fractionated, preferably by steam or vacuum distillation, if it is desired to produce polymers of greater non-volatile content. Such a polymerization treatment is commonly known in the art as a Gray tower process and the product is referred to as Gray tower polymer.

It has been found that a certain fraction or portion of these unsaturated hydrocarbons, particularly the Gray tower polymer which is a by-product from the refining of cracked gasoline, is suitable for use as a drying oil. That is, when exposed to air the light components first evaporate and then the remaining hydrocarbon oxidizes to a hard film.

Usually the more volatile fraction of the Gray tower polymer is used for this purpose. This material is highly unsaturated as indicated by a relatively high iodine number (Wijs method). On drying, a brittle film is formed from this untreated polymer. After standing for a few weeks the film becomes checked and eventually cracks. This, of course, makes it unsuitable for uses where a continuous film is required.

It has now been found that a drying oil producing a film of superior qualities is obtained, when the drying oil described above is first reacted with an aldehyde in the presence of an acid catalyst such as sulfuric acid. This condensation product will dry to a film, as did the untreated oil, but on continued exposure to air it will not check or crack. Consequently it is much more suitable for use as a drying oil.

The lighter, highly unsaturated portion of the Gray tower polymer is particularly suitable for this purpose, since it contains a large proportion of multiple ring compounds. Both aliphatic and aromatic aldehydes, formaldehyde and benzaldehyde, have been condensed with the hydrocarbon fraction and both products dried to form films with improved characteristics. The reaction takes place in the presence of sulfuric acid, which acts as a catalyst, at temperatures from about 30° F. to 220° F. at atmospheric pressure.

In general, the process may be carried out by contacting a mineral oil polymer of the type referred to above and preferably a fraction boiling in the range of about 350° to 600° F. or intermediate fractions boiling within this range with an aldehyde in the presence of an acid catalyst as described herein. Aldehydes which may be used include formaldehyde, acetaldehyde, furfural, paraformaldehyde, benzaldehyde, and other aldehydes susceptible to condensation with unsaturated materials in the presence of condensed catalyst.

Hexamethylenetetramine may also be used.

The condensation reaction may be carried out in various ways, for example, the hydrocarbon, acid catalyst and aldehyde may be admixed and stirred vigorously while the desired temperature is maintained. In order to prevent polymerization of the aldehyde with itself the aldehyde may be vaporized and then introduced into the acid-hydrocarbon mixture while stirring vigorously. Various concentrations of acids may be used as desired; for example, in using sulfuric acid, from 5 to 25 per cent by weight of either dilute or concentrated sulfuric acid or intermediate concentrations may be used.

*Example I*

The more volatile fraction of a sample of Gray tower polymer boiling between 350° and 600° F. recovered from a mixed liquid-vapor phase thermally cracked gasoline was selected as the unsaturated material to be reacted with aldehyde. The polymer had a Wijs iodine number of more than 200 and contained a large proportion of multiple ring compounds. 100 gms. of this polymer were admixed with 25 gms. by weight of benzaldehyde and agitated with 50 cc. of 50 per cent $H_2SO_4$. The agitation was continued at a temperature of about 100° F. for several hours. A heavy liquid polymer was recovered and when dried as a thin film on glass produced a much tougher film than the original oil. No checking or cracking occurred on drying by contrast with considerable checking and cracking of the original polymer oil film.

*Example II*

150 cc. of a mid-fraction of a reduced Gray tower polymer produced in the vapor phase thermal cracking of gas oil and separated from the gasoline fraction and boiling between about 400° and 600° F. were admixed with 48 cc. of concentrated sulfuric acid and 48 cc. of 40 per cent formaldehyde solution. About 200 cc. of 40 per cent formaldehyde were vaporized and condensed into this mixture while it was being stirred vigorously with an electric stirrer. Temperature was maintained at about 212° F. and a highly viscous polymer oil was obtained. The product was insoluble in normal pentane and water but became readily dispersed in acetone. The resulting product was dried as a thin film on glass and produced a tough film which did not check or crack on drying.

I claim:

1. The method of manufacturing an improved drying oil from unsaturated polymers obtained in the clay treating of cracked gasoline at elevated temperatures and boiling within the range of 350 to 600° F. which comprises forming a mixture of said polymer in the liquid phase with an acid condensation catalyst, agitating said mixture while introducing an aldehyde in the vapor phase to produce an oil having improved drying properties, and maintaining a temperature within the range of 30 to 220° F. while the reaction takes place.

2. The method of manufacturing an improved drying oil from unsaturated polymers obtained in the clay treating of cracked gasoline at elevated temperatures and boiling within the range of 350 to 600° F. which comprises forming a mixture of said polymer in the liquid phase with 5 to 25 per cent by weight of sulfuric acid as a condensation catalyst, agitating said mixture while introducing an aldehyde in the vapor phase to produce an oil having improved drying properties, and maintaining a temperature within the range of 30 to 220° F. while the reaction takes place.

3. A method in accordance with claim 1 in which the aldehyde is selected from the group consisting of formaldehyde, acetaldehyde, furfural, and benzaldehyde.

4. A method in accordance with claim 3 in which the acid condensation catalyst is sulfuric acid.

5. A method in accordance with claim 1 in which the aldehyde is formaldehyde and the acid condensation catalyst is sulfuric acid.

6. A method in accordance with claim 1 in which the aldehyde is benzaldehyde and the acid condensation catalyst is sulfuric acid.

7. A method in accordance with claim 2 in which the aldehyde is selected from the group consisting of formaldehyde, acetaldehyde, furfural, and benzaldehyde.

ROBERT C. GOODWIN.

REFERENCES CITED

The following references are of record in the file of this patent:

UNITED STATES PATENTS

| Number | Name | Date |
|---|---|---|
| 1,933,716 | Day | Nov. 7, 1933 |
| 2,008,102 | Hyman | July 16, 1935 |
| 2,035,123 | Fulton | Mar. 24, 1936 |
| 2,252,333 | Rothrock | Aug. 12, 1941 |
| 2,382,184 | Thompson | Aug. 14, 1945 |
| 2,395,739 | Hershberger | Feb. 26, 1946 |